United States Patent
Andreev et al.

(10) Patent No.: US 11,321,295 B2
(45) Date of Patent: May 3, 2022

(54) SYSTEMS AND METHODS FOR IMPROVING INDEXER PERFORMANCE BY MULTIPLEXING DATA OF AN UNDERLYING INDEX

(71) Applicant: Acronis International GmbH, Schaffhausen (CH)

(72) Inventors: Alexander Andreev, Sofia (BG); Sergey Onuchin, Moscow (RU); Hiten Gajjar, Singapore (SG); Dulitha Gunasekera, Singapore (SG); Dian Bakti, Singapore (SG); Prabhuraj Reddy, Singapore (SG); Yee Chen Lim, Singapore (SG); Serguei Beloussov, Costa del Sol (SG); Stanislav Protasov, Moscow (RU)

(73) Assignee: Acronis International GmbH, Schaffhausen (CH)

( * ) Notice: Subject to any disclaimer, the term of this patent is extended or adjusted under 35 U.S.C. 154(b) by 238 days.

(21) Appl. No.: 16/683,809

(22) Filed: Nov. 14, 2019

(65) Prior Publication Data

US 2021/0149863 A1 May 20, 2021

(51) Int. Cl.
*G06F 16/22* (2019.01)
*G06F 16/23* (2019.01)

(52) U.S. Cl.
CPC ...... *G06F 16/2272* (2019.01); *G06F 16/2379* (2019.01)

(58) Field of Classification Search
CPC .................. G06F 16/2272; G06F 16/2379
See application file for complete search history.

(56) References Cited

U.S. PATENT DOCUMENTS

| 9,165,005 | B2* | 10/2015 | Beaverson | G06F 3/0616 |
| 9,336,232 | B1* | 5/2016 | Srivastav | G06F 3/061 |
| 10,003,555 | B1* | 6/2018 | O'Brien | H04L 49/405 |
| 2014/0095458 | A1* | 4/2014 | Kim | G06F 16/2255 707/698 |
| 2014/0337375 | A1* | 11/2014 | Yue | G06F 16/245 707/769 |
| 2018/0253449 | A1* | 9/2018 | Feldman | G06F 16/21 |
| 2018/0322062 | A1* | 11/2018 | Watkins | G06F 12/0864 |
| 2018/0349374 | A1* | 12/2018 | Gurajada | G06F 16/2255 |

* cited by examiner

*Primary Examiner* — Huawen A Peng
(74) *Attorney, Agent, or Firm* — ArentFox Schiff LLP; Michael Fainberg

(57) ABSTRACT

Disclosed herein are systems and method for multiplexing data of an underlying index. In an exemplary aspect, an index handler may generate a plurality of slots and a plurality of data buckets for a traditional index. The index handler may receive, from a software application, a request to access a data file. The index handler may determine whether any slot of the plurality of slots is attached to a respective data bucket of the plurality of data buckets comprising the data file. In response to determining that a first slot of the plurality of slots is attached to a first data bucket comprising the data file, the index handler may enable, via the first data bucket attached to the first slot, access to the data file to the software application.

20 Claims, 5 Drawing Sheets

SYSTEMS AND METHODS FOR IMPROVING INDEXER PERFORMANCE BY MULTIPLEXING DATA OF AN UNDERLYING INDEX

FIELD OF TECHNOLOGY

The present disclosure relates to the field of indexers, and, more specifically, to systems and methods for improving indexer performance by multiplexing data of an underlying index.

BACKGROUND

Indexing mechanisms are commonly used to improve search speed and optimize certain accesses to data managed in files. Usually an indexer provides a traditional index as a unit of data storage. In order to maintain separation of customer data, conventional indexing systems tend to create an index per user, leading to a large amount of indices. This causes degradation in indexer performance and higher demand for system resources to load/keep all indexes in memory for indexing or search operations.

SUMMARY

Aspects of the present disclosure describe methods and systems for multiplexing data of an underlying index. In an exemplary aspect, an index handler may generate a plurality of slots and a plurality of data buckets for an index, wherein at least one respective data bucket of a plurality of data buckets is attached to a respective slot of the plurality of slots. The index handler may receive, from a software application, a request to access a data file. The index handler may determine whether any slot of the plurality of slots is attached to a respective data bucket of the plurality of data buckets comprising the data file. In response to determining that none of the plurality of slots is attached to the respective data bucket comprising the data file, the index handler may search for the data file in data buckets of the plurality of data buckets not attached to any of the plurality of slots. In response to identifying, based on the searching, a first data bucket of the plurality of data buckets that (1) comprises the data file and (2) is not attached to any of the plurality of slots, the index handler may attach the first data bucket to a first slot of the plurality of slots and may enable, via the first data bucket attached to the first slot, access to the data file to the software application.

In another exemplary aspect, an index handler may generate a plurality of slots and a plurality of data buckets for a traditional index. The index handler may receive, from a software application, a request to access a data file. The index handler may determine whether any slot of the plurality of slots is attached to a respective data bucket of the plurality of data buckets comprising the data file. In response to determining that a first slot of the plurality of slots is attached to a first data bucket comprising the data file, the index handler may enable, via the first data bucket attached to the first slot, access to the data file to the software application.

In some aspects, a first subset of the plurality of data buckets may be stored on a first device and a second subset of the plurality of data buckets may be stored on a second device.

In some aspects, in response to determining that none of the plurality of data buckets comprises the data file, the index handler may search for an image associated with data file in a file system, wherein the data file is of a first type of data and may generate a second data bucket based on the image.

In some aspects, an image associated with the data file is not found and in response to determining that the image does not exist, the index handler may perform a look-up of index mapping configuration files for the first type of data. The index handler may request an indexer to create a new index based on the index mapping configuration files. The index handler may receive the new index from the indexer, may generate an image of the new index, and may copy the generated image to create the second data bucket.

In some aspects, attaching the first data bucket to the first slot of the plurality of slots may comprise the index handler determining whether at least one slot of the plurality of slots is available and is compatible with a first type of data associated with the data file and in response to determining that the first slot is available is compatible with the first type of data, selecting the first slot to attach to the first data bucket.

In some aspects, in response to determining that the at least one slot is not available, the index handler may provide a configuration file to the indexer to create a new slot. The index handler may clear contents of the new slot created by the indexer and may record a slot name and information type of the new slot. The index handler may then identify the first slot as the new slot to attach to the first data bucket.

In some aspects, attaching the first data bucket to the first slot of the plurality of slots may comprise of the index handler mounting the first data bucket to the first slot for a pre-determined lease time.

In some aspects, the index handler may detach the first data bucket from the first slot in response to determining that the pre-determined lease time has expired.

It should be noted that the aspects discussed above may be implemented by a processor of a system configured to multiplex data of an underlying index. It should also be noted that the aspects discussed above may be implemented in the form of instructions of a non-transitory computer readable medium storing thereon computer executable instructions.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for improving indexer performance by multiplexing data of an underlying index. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Multiplexing the underlying data of an index without the indexers knowledge, helps reduce the number of index resources (e.g., N) operated by indexer while still offering search and indexing benefits across M indices where N<M. Thus, the system memory requirements are optimized and indexed data persists on different storage (e.g., from same machine to remote machine). The latter enables virtually unlimited storage while never failing on an indexer machine's storage needs.

The following features will be used in describing the present disclosure:

Indexer—An application that stores the indexed data used for search purposes (e.g., Elastic Search).

Traditional Index—A resource that is a collection of data searchable by an indexer.

Index Image—The files and folders generated as a result of creating a traditional index by the indexer. It should be noted that an index image does not have user data in it.

Data Bucket—The files and folders in a traditional index after indexing user data.

Slot—A husk of an index with no data in it. This is the endpoint known by the indexer and believed to contain index data. It cannot be used for indexing or searching operations until made into an attached slot.

Attached Slot—A data bucket mounted to a slot. This entity can be accessible and searchable via the indexer.

Attach—The operation of mounting or linking a data bucket onto a slot to produce an attached slot.

Detach—The operation of unmounting or unlinking an attached slot.

Figure 1:
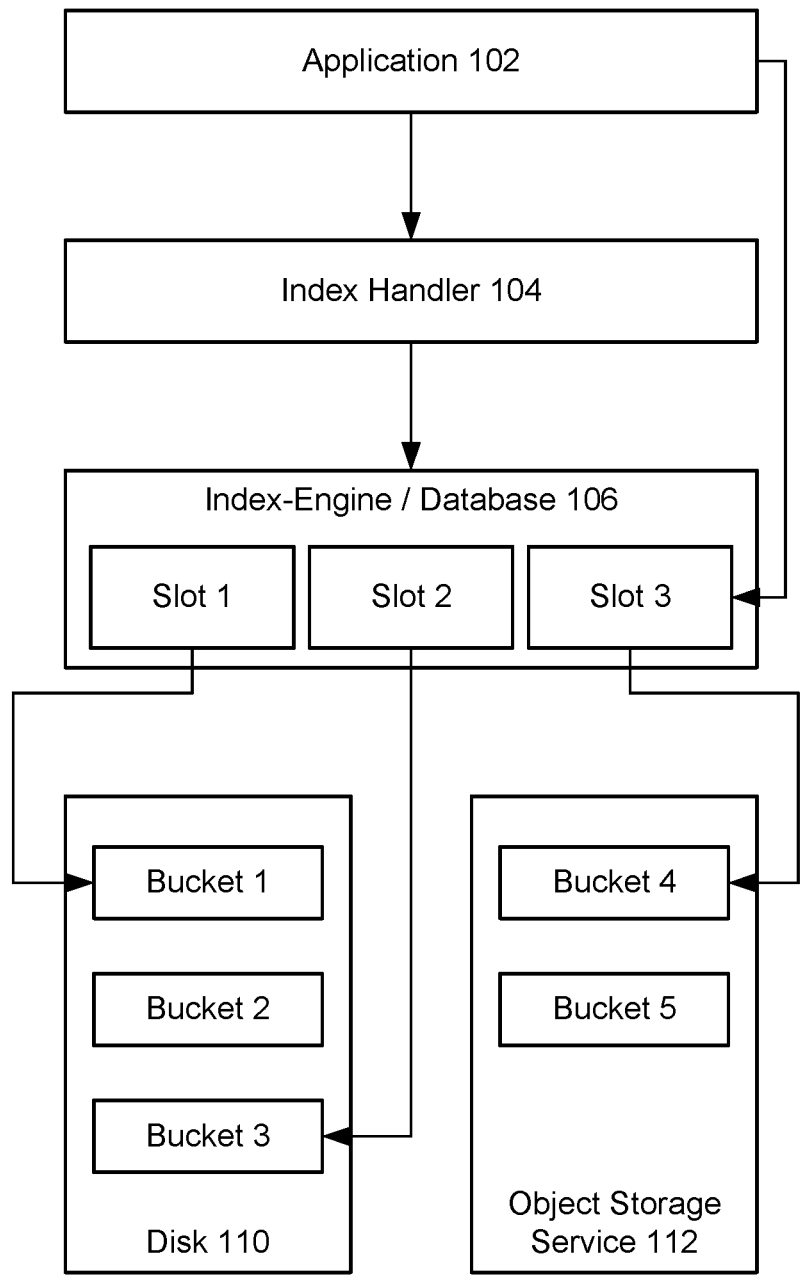
FIG. 1 is a block diagram illustrating a system for multiplexing data of an underlying index, in accordance with aspects of the present disclosure.

FIG. 1 is a block diagram illustrating system 100 for multiplexing data of an underlying index, in accordance with aspects of the present disclosure. System 100 comprises application 102, index handler 104, index-engine 106, disk 110 and object storage service 112. Index-engine 106 may comprise a plurality of slots (e.g., slot 1, 2, and 3). Disk 110 and object storage service 112 may comprise a plurality of data buckets (e.g., bucket 1, 2, 3, etc.). It should be noted that index-engine 106, disk 110, and object storage service 112 comprise only a few slots and data buckets in FIG. 1 for simplicity. A person skilled in the art would appreciate that the respective components may comprise any number of slots/data buckets.

In an exemplary aspect, index handler 104 may split a traditional index into a slot and a data bucket, and may manage the two components independently. The independent management provides flexibility in maintaining a different number of slots and a different number of data buckets. Index hander 104 may be configured to:

a. Create slots, index images and data buckets.

b. Maintain compatibility information about slots and data buckets.

c. Access control to slots via reference counting.

d. Perform attach and detach operations.

e. Reclaim slots and data buckets after lease expiry.

f. Increase and decrease Slots to match demand.

Index handler 104 may receive a request from application 102 to access data buckets (e.g., buckets 1, 2, 3, etc.) via its name. This is made available via a slot name (e.g., similar to a file handle) for a requested lease period. If no such data bucket exists, index handler 104 may carry out necessary steps to create such an entity.

By splitting an index from its data, index handler 104 may control the number of indices seen by an indexer. Index handler 104 may increase and decrease the number of slots to match demand, ensuring that the indexer is not wasting resources on behalf of untouched data.

An indexer supports the ability to open and close an index. For example, index handler 104 may generate a close index request for the indexer to stop accessing index-engine 106's files and folders. In the same manner, index handler 104 may generate an open index request enabling the indexer to access index-engine 106's files and folders and to rebuild any required cache.

The indexer may be configured to determine the attached slot location. Index handler 104 may be configured to determine a hash value of a data bucket name. For example, the hash value may be xaybzc12sfa. Index handler 104 may identify a first set of characters (e.g., the first 6 characters) of the determined hash value and generate a path name for the data bucket. Specifically, index handler 104 may divide the 6 characters into a plurality of portions (e.g., 3 portions of "xa," "yb," and "zc") and create a respective directory for each portion. The path generated by index handler 104 may thus take the form "type/version/xa/yb/zc/bucket hash". The division of directories based on hash value distributes the data buckets in a tree-like fashion in the file system, thus limiting the number of data buckets per folder and causing high file-access speeds.

Index handler 104 may be configured to attach and detach slots from data buckets. The attach and detach operations may be carried out via a mount or a soft link operation depending on where the data bucket resides on the file system. Index handler 104 may apply additional operations at the point of attach or detach for additional functionality. Such operations include compressing and decompressing data, and encrypting and decrypting data.

In the event that application 102 cannot detach a slot (e.g., slot 1), index handler 104's leasing mechanism kicks in and detaches the slot. Index handler 104 may take note of the time when an attach request was received and may use the heartbeat of application 102 (e.g., the periodic signal generated by application 102 indicating normal operation) to keep a slot (e.g., slot 1) available for access (e.g., this refers to leasing the slot). Index handler 104 will detach the slot if the heartbeat is lost, preventing clogging of resources.

It should be noted that attached slots may be accessed by more than one application at a time. Index handler 104 may additionally perform reference counting per slot to prevent slots from being prematurely detached during access. In addition, images and data buckets may be stored independently (e.g., in different folders). It should also be noted that data buckets may be stored in different locations such as disk 110 and object storage server 112 (e.g., Amazon S3). A first slot on index-engine 106 may be mounted to a data bucket in a first location and a second slot on index-engine 106 may simultaneously mounted to a data bucket in a second location. This is depicted in FIG. 1, where slot 1 is connected to bucket 1 of disk 110 and slot 3 is connected to bucket 4 of object storage server 112.

Figure 2A:
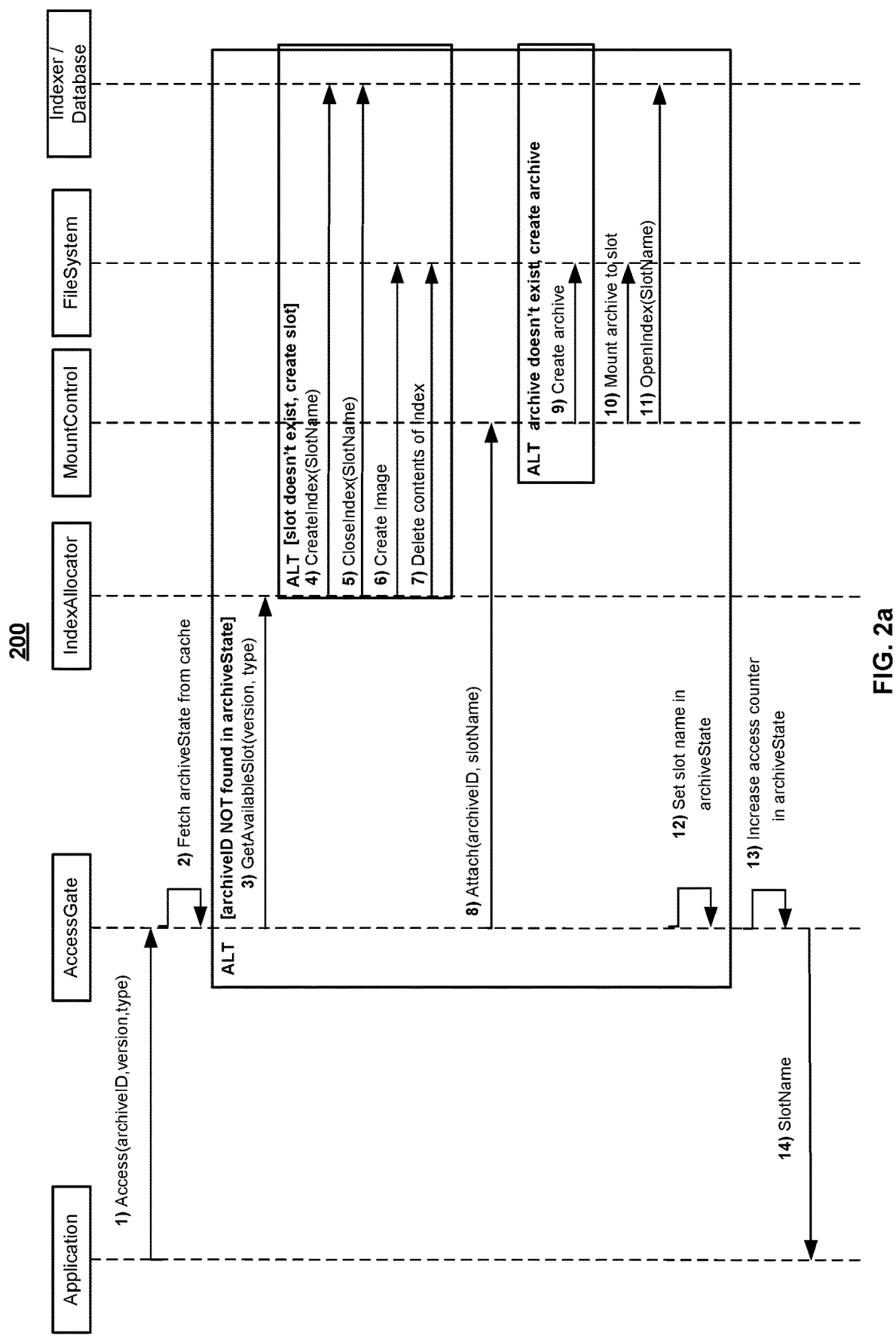
FIG. 2a is a block diagram illustrating an index manager agent open flow, in accordance with aspects of the present disclosure.

FIG. 2a is a block diagram illustrating index manager agent open flow 200, in accordance with aspects of the present disclosure. Index handler 104 may comprise three components: access gate, index allocator, and mount control. The access gate may keep track of the slots currently in attached state, and may handle multiple access to the same resource using reference counting. The index allocator may keep track of available slots and may provide them on request (e.g., similar to a memory manager). The mount control may perform attach, detach, and file system manipulation operations. In some aspects, file system is analogous to disk 110 and indexer/database is analogous to index-engine/database 106.

Referring to flow 200, at point 1, application 102 executes a command "access(archiveID, version, type)" for requesting access to a data bucket. Via this command, application 102 may request the access gate of index handler 104 for access to, for example, a "MyArchiveForMail" data bucket to index metadata about a recent mail backup. ArchiveID, version, and type are descriptors of the specific data bucket (e.g., MyArchiveForMail). At point 2, the access gate fetches the archiveState from the cache of index handler 104 to determine whether such a data bucket "MyArchiveForMail" is currently in use. The archiveState may provide statuses (e.g., attached, detached, open, etc.) of the slots and data buckets for a given index. Referring to FIG. 1, application 102 may be requesting access to Bucket 5 in object storage service 112. The archiveState may indicate that slot 1 is attached to bucket 1, slot 2 is attached to bucket 3, and slot 3 is attached to bucket 4.

In particular, the access gate determines whether a data bucket matching the archiveID, version, and type is found in the archiveState. If a matching data bucket is found, flow 200 advances to point 13, where the access gate increases an access counter in the archiveState for the attached slot associated with the data bucket. The increase in access counter allows index handler 104 to accommodate multiple accesses of a data bucket through a given slot. For example, if another application is accessing a data bucket (indicating that the access counter is at least 1 for the slot attached to the data bucket), index handler 104 will not detach the slot from the accessed data bucket (discussed in greater detail in FIG. 2b). Subsequent to point 13, flow 200 advances to point 14 where the access gate returns, to application 102, the slotName of the particular slot attached to the requested data bucket.

If at point 2 the access gate determines that the requested data bucket is not found in the archiveState (i.e., no such data bucket is open), the access gate attempts to open the data bucket by requesting a free compatible slot (of the same type and version) from the index allocator. This is performed at point 3, where the access gate executes a command "GetAvailableSlot(version, type)." For example, in FIG. 1, bucket 5 is not considered open because bucket 5 is not attached to any of the slots of index engine 106. If a slot is available (i.e., is not attached to any data bucket) and is compatible (i.e., shares the version and type with the data bucket), the index allocator determines a slotName of the available slot. The access gate then receives the slotName from the index allocator and flow 200 advances to point 8, where the access gate issues a command "attach(archiveID, slotName)" to the mount control, which attaches the available slot to a data bucket.

However, if no slot is available or compatible, the index allocator creates a slot by requesting the indexer (e.g., index engine 106) to create an index with the requested type, version and a randomly generated name, at point 4. For example, in FIG. 1, none of the slots are available and therefore another slot needs to be created. In particular, the index allocator may execute a command "createIndex(slotName)" with the desired slotName for the new slot and may provide a configuration file with information about the type, version, etc., to index engine 106. When an indexer receives a configuration file and a slot name, the indexer creates an index (e.g., a traditional index). Subsequently, at point 5, the index allocator may request index engine 106 to stop working on the created index by executing the command "closeIndex(slotName)." It should be noted that when creating an index for the first time, a configuration file is provided to index hander 104 at a point of deployment. The configuration file dictates the type of index.

At point 6, the index allocator creates an image of the index in the file system by copying the contents to a different preconfigured directory. An image is created when the configuration file is copied to a different directory without indexing any information to it (i.e., in the configuration file's original state). In order to create a data bucket or even multiple data buckets, this image can be copied to another location. When the inner contents of the traditional index are deleted, a slot is created. Specifically, at point 7, the index allocator deletes the inner contents of the created index from the file system, in effect creating a slot. Thus, every slot has an image and an image can be used to create N data buckets. Flow 200 then advances to point 8, where the index allocator issues a command "attach(archiveID, slotName)" to the mount control, which attaches the new slot to a data bucket.

The mount control checks to see if a data bucket with name "MyArchiveForMail" exists in the file system in a preconfigured location. If such a data bucket does not exist (e.g., "MyArchiveForMail" does not exist), the mount control creates an archive (i.e., the data bucket) at point 9 by copying the slot image to a folder named after the archiveID, thus, for example, creating a data bucket with the name "MyArchiveForMail." At point 10, the mount control mounts the created data bucket to the slot by performing a mount operation (e.g., soft link or bind mount). At point 11, the mount control calls Indexer API (e.g., issuing command "OpenIndex(slotName)") to open the slot. In the context of FIG. 1, points 10 and 11 may culminate in a new slot being attached to bucket 5 (or a new bucket altogether if "MyArchiveForMail" does not exist). At point 12, the access get sets the slotName of the new/available slot in the archiveState (indicating the attachment). At point 13, the access gate increments the counter to indicate that a new application request has been made to access the data bucket in its cache. Lastly at point 14, the access gate returns the slotName to the caller.

Figure 2B:
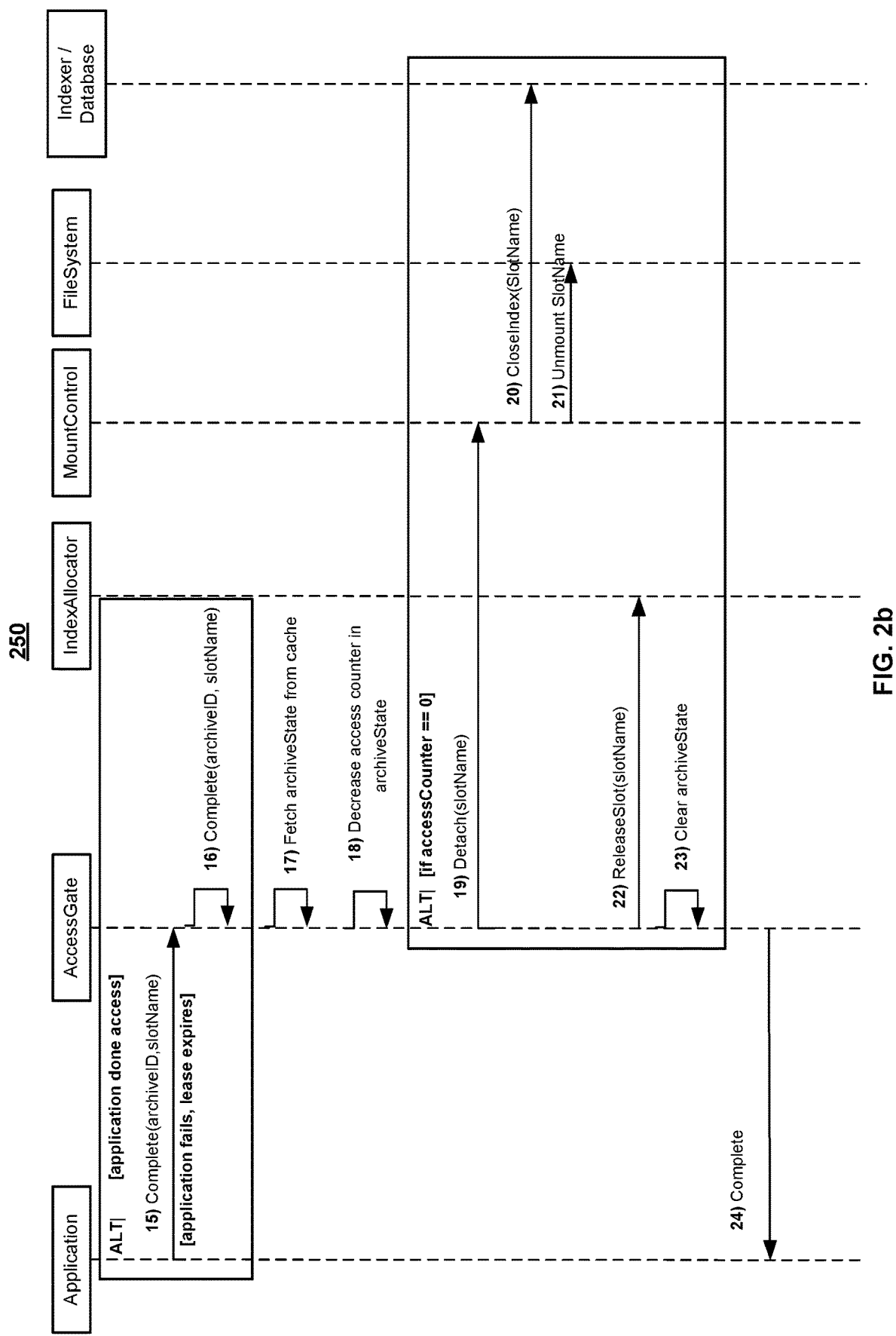
FIG. 2b is a block diagram illustrating an index manager agent close flow, in accordance with aspects of the present disclosure.

FIG. 2b is a block diagram illustrating index manager agent close flow 250, in accordance with aspects of the present disclosure. In some aspects, flow 250 may proceed directly after flow 200. When application 102 has completed access to the data bucket or when the lease time for the data bucket access has expired, application 102 issues a command "complete(archiveID, slotName)" to the access gate, indicating the access completion at point 15. At point 16, the access gate of index handler 104 executes the command. At point 17, the access gate fetches the archiveState from cache. At point 18, the access gate decreases the access counter of the slot in the archiveState. For example, referring to FIG. 1, slot 1 may be attached to bucket 1. Application 102 may access data bucket 1 via slot 1. After completing access, application 102 notifies index handler 104. The access gate of index handler 104 decrements the access counter of slot 1 (indicating that one less application is accessing bucket 1). Flow 250 thus ends at point 24.

In some aspects, decrementing the access counter may cause the counter to reach zero. When the counter is zero, no other application is accessing the bucket through the particular slot. In that case, it may be advantageous to keep the slot available in case a detached data bucket (e.g., bucket 5) is requested for access by any application or remove the slot altogether to free up resources. Thus, at point 19, the access gate issues a command "detach(slotName)" to the mount control indicating the slotName of the slot (e.g., slot 1) to be detached. At point 20, the mount control issues a command "closeIndex(slotName)" to the indexer. At point 21, the mount control unmounts the data bucket (e.g., bucket 1) from the slot (e.g., slot 1).

In some aspects, if the slot is to be removed, at point 22, the access gate issues a command "releaseSlot(slotName)" to index allocator to remove the slot. At point 23, the access gate clears the archiveState such that the slot is not shown to be available.

Figure 3:
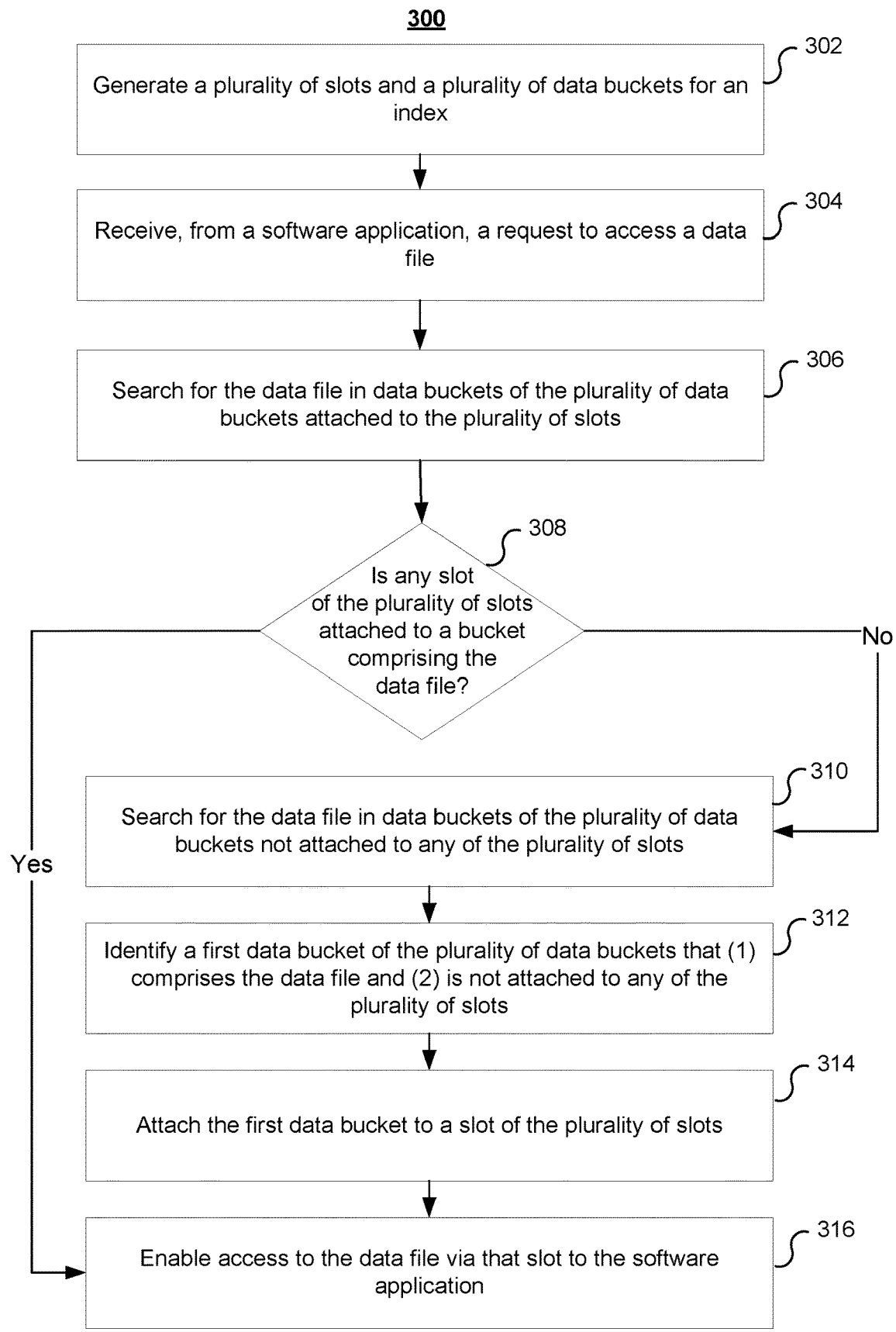
FIG. 3 illustrates a flow diagram of a method for multiplexing data of an underlying index, in accordance with aspects of the present disclosure.

FIG. 3 illustrates a flow diagram of method 300 for multiplexing data of an underlying index, in accordance with aspects of the present disclosure. At 302, index handler 104 generates a plurality of slots and a plurality of data buckets for an index. At 304, index handler 104 receives, from a software application (e.g., application 102), a request to access a data file. At 306, index handler 104 searches for the data file in data buckets of the plurality of data buckets attached to the plurality of slots. For example, referring to FIG. 1, index handler 104 may search for the data file in buckets 1, 3 and 4, which are connected to slots 1, 2, and 3, respectively.

At 308, index handler 104 determines whether any slot is attached to a data bucket comprising the data file. In response to determining that none of the slots are attached to a data bucket comprising the data file, method 300 advances to 310, where index handler 104 searches for the data file in data buckets of the plurality of data buckets not attached to any of the plurality of slots. For example, index handler 104 may search for the data file in buckets 2 and 5.

At 312, index handler 104 identifies a first data bucket of the plurality of data buckets that (1) comprises the data file and (2) is not attached to any of the plurality of slots. For example, index handler 104 may find the data file in bucket 5. At 314, index handler 104 attaches the first data bucket to a slot of the plurality of slots. For example, index handler 104 may detach one of slots 1, 2, and 3 to make them attachable for bucket 5, or may create a new slot to attach with bucket 5. In some aspects, index handler 104 ensures that the slot to be attached to bucket 5 is compatible in terms of version and type to bucket 5.

At 316, index handler 104 enables access to the data file via that slot to the software application. Should index handler 104 identify a slot at 308 that is attached to a data bucket comprising the data file, method 300 advances from 308 to 316.

Figure 4:
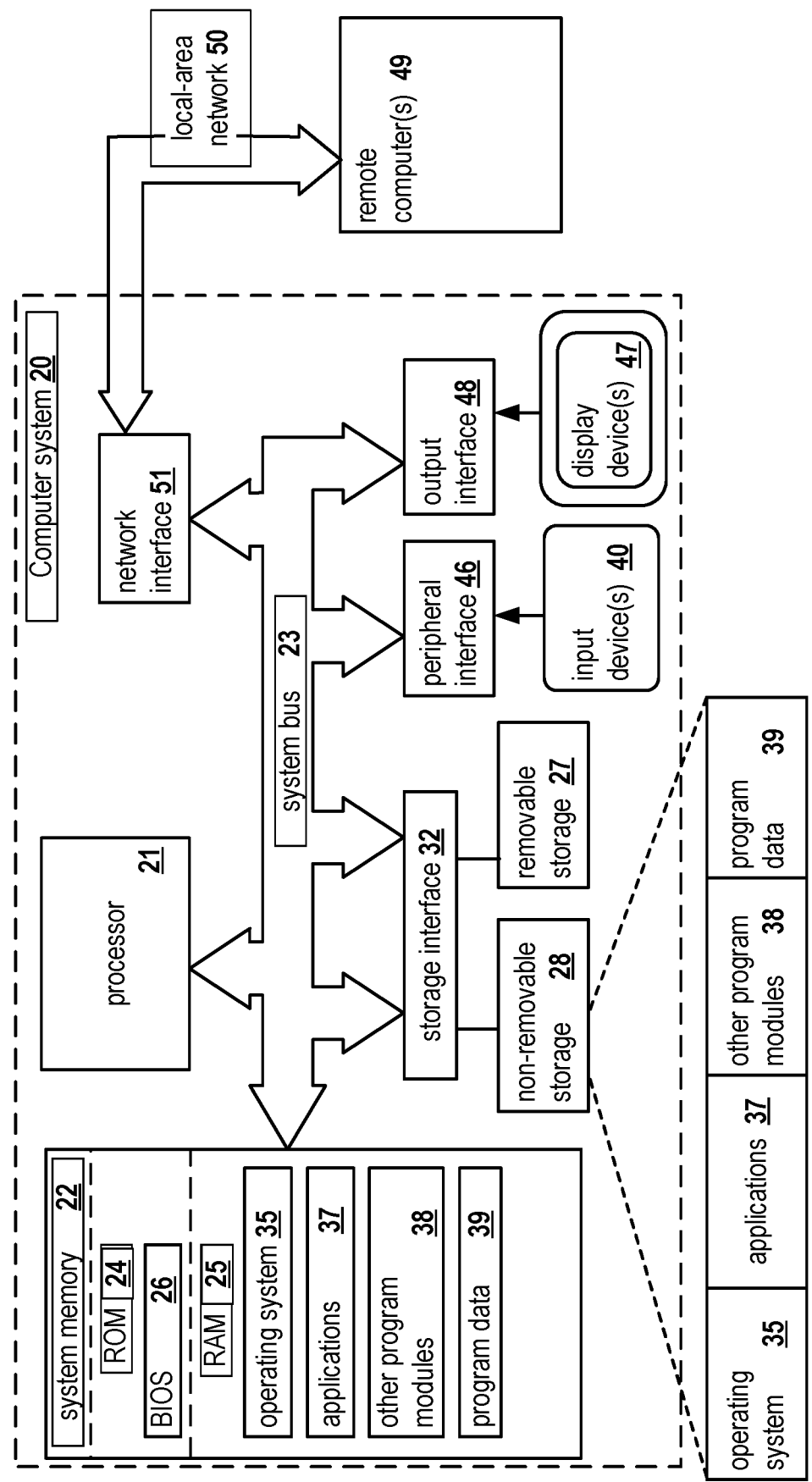
FIG. 4 presents an example of a general-purpose computer system on which aspects of the present disclosure can be implemented.

FIG. 4 is a block diagram illustrating a computer system 20 on which aspects of systems and methods for multiplexing data of an underlying index may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of the commands/steps discussed in FIGS. 2a, 2b, and 3, and any action of the index handler may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for multiplexing data of an underlying index, the method comprising:
    generating a plurality of slots and a plurality of data buckets for an index, wherein at least one respective data bucket of a plurality of data buckets is attached to a respective slot of the plurality of slots;
    receiving, from a software application, a request to access a data file;
    determining whether any slot of the plurality of slots is attached to a respective data bucket of the plurality of data buckets comprising the data file;
    in response to determining that none of the plurality of slots is attached to the respective data bucket comprising the data file, searching for the data file in data buckets of the plurality of data buckets not attached to any of the plurality of slots;
    in response to identifying, based on the searching, a first data bucket of the plurality of data buckets that (1) comprises the data file and (2) is not attached to any of the plurality of slots, attaching the first data bucket to a first slot of the plurality of slots; and
    enabling, via the first data bucket attached to the first slot, access to the data file to the software application.

2. The method of claim 1, wherein a first subset of the plurality of data buckets is stored on a first device and a second subset of the plurality of data buckets is stored on a second device.

3. The method of claim 1, further comprising:
    in response to determining that none of the plurality of data buckets comprises the data file, searching for an image associated with data file in a file system, wherein the data file is of a first type of data; and
    generating a second data bucket based on the image.

4. The method of claim 3, wherein an image associated with the data file is not found, further comprising:
    in response to determining that the image does not exist, performing a look-up of index mapping configuration files for the first type of data;
    requesting an indexer to create a new index based on the index mapping configuration files;
    receiving, from the indexer, the new index;
    generating an image of the new index; and
    copying the generated image to create the second data bucket.

5. The method of claim 1, wherein attaching the first data bucket to the first slot of the plurality of slots, further comprises:
    determining whether at least one of the plurality of slots is available and is compatible with a first type of data associated with the data file;
    in response to determining that the first slot is available is compatible with the first type of data, selecting the first slot to attach to the first data bucket.

6. The method of claim 5, further comprising:
    in response to determining that the at least one slot is not available, providing a configuration file to the indexer to create a new slot;
    clearing contents of the new slot created by the indexer;
    recording a slot name and information type of the new slot; and
    identifying the first slot as the new slot to attach to the first data bucket.

7. The method of claim 1, wherein attaching the first data bucket to the first slot of the plurality of slots comprises mounting the first data bucket to the first slot for a pre-determined lease time.

8. The method of the claim 7, further comprising detaching the first data bucket from the first slot in response to determining that the pre-determined lease time has expired.

9. A system for multiplexing data of an underlying index, the system comprising:
    a processor configured to:
        generate a plurality of slots and a plurality of data buckets for an index, wherein at least one respective data bucket of a plurality of data buckets is attached to a respective slot of the plurality of slots;
        receive, from a software application, a request to access a data file;
        determine whether any slot of the plurality of slots is attached to a respective data bucket of the plurality of data buckets comprising the data file;
        in response to determining that none of the plurality of slots is attached to the respective data bucket comprising the data file, search for the data file in data buckets of the plurality of data buckets not attached to any of the plurality of slots;
        in response to identifying, based on the searching, a first data bucket of the plurality of data buckets that (1) comprises the data file and (2) is not attached to any of the plurality of slots, attach the first data bucket to a first slot of the plurality of slots; and
        enable, via the first data bucket attached to the first slot, access to the data file to the software application.

10. The system of claim 9, wherein a first subset of the plurality of data buckets is stored on a first device and a second subset of the plurality of data buckets is stored on a second device.

11. The system of claim 9, wherein the processor is further configured to:
    in response to determining that none of the plurality of data buckets comprises the data file, search for an image associated with data file in a file system, wherein the data file is of a first type of data; and
    generate a second data bucket based on the image.

12. The system of claim 11, wherein an image associated with the data file is not found, and wherein the processor is further configured to:
    in response to determining that the image does not exist, perform a look-up of index mapping configuration files for the first type of data;
    request an indexer to create a new index based on the index mapping configuration files;
    receive, from the indexer, the new index;
    generate an image of the new index; and
    copy the generated image to create the second data bucket.

13. The system of claim 9, wherein attaching the first data bucket to the first slot of the plurality of slots, wherein the processor is further configured to:

determine whether at least one slot of the plurality of slots is available and is compatible with a first type of data associated with the data file;

in response to determining that the first slot is available is compatible with the first type of data, select the first slot to attach to the first data bucket.

14. The system of claim 13, wherein the processor is further configured to:

in response to determining that the at least one slot is not available, provide a configuration file to the indexer to create a new slot;

clear contents of the new slot created by the indexer;

record a slot name and information type of the new slot; and identify the first slot as the new slot to attach to the first data bucket.

15. The system of claim 9, wherein the processor is further configured to attach the first data bucket to the first slot of the plurality of slots by mounting the first data bucket to the first slot for a pre-determined lease time.

16. The system of the claim 15, wherein the processor is further configured to detach the first data bucket from the first slot in response to determining that the pre-determined lease time has expired.

17. A non-transitory computer readable medium storing thereon computer executable instructions for multiplexing data of an underlying index, comprising instructions for:

generating a plurality of slots and a plurality of data buckets for an index, wherein at least one respective data bucket of a plurality of data buckets is attached to a respective slot of the plurality of slots;

receiving, from a software application, a request to access a data file;

determining whether any slot of the plurality of slots is attached to a respective data bucket of the plurality of data buckets comprising the data file;

in response to determining that none of the plurality of slots is attached to the respective data bucket comprising the data file, searching for the data file in data buckets of the plurality of data buckets not attached to any of the plurality of slots;

in response to identifying, based on the searching, a first data bucket of the plurality of data buckets that (1) comprises the data file and (2) is not attached to any of the plurality of slots, attaching the first data bucket to a first slot of the plurality of slots; and enabling, via the first data bucket attached to the first slot, access to the data file to the software application.

18. The non-transitory computer readable medium of claim 17, wherein a first subset of the plurality of data buckets is stored on a first device and a second subset of the plurality of data buckets is stored on a second device.

19. The non-transitory computer readable medium of claim 17, further comprising instructions for:

in response to determining that none of the plurality of data buckets comprises the data file, searching for an image associated with data file in a file system, wherein the data file is of a first type of data; and generating a second data bucket based on the image.

20. The non-transitory computer readable medium of claim 19, wherein an image associated with the data file is not found, further comprising instructions for:

in response to determining that the image does not exist, performing a look-up of index mapping configuration files for the first type of data;

requesting an indexer to create a new index based on the index mapping configuration files;

receiving, from the indexer, the new index;

generating an image of the new index; and copying the generated image to create the second data bucket.

* * * * *